No. 760,193. PATENTED MAY 17, 1904.
E. L. GAYLORD.
ARTICLE MADE FROM AMBER OR AMBROID.
APPLICATION FILED MAR. 22, 1904.
NO MODEL.

WITNESSES:
H. A. Lamb
M. T. Louden

INVENTOR
Edward L. Gaylord
BY
ATTORNEY

No. 760,193.

Patented May 17 1904.

UNITED STATES PATENT OFFICE.

EDWARD L. GAYLORD, OF BRIDGEPORT, CONNECTICUT.

ARTICLE MADE FROM AMBER OR AMBROID.

SPECIFICATION forming part of Letters Patent No. 760,193, dated May 17, 1904.

Application filed March 22, 1904. Serial No. 199,419. (No model.)

*To all whom it may concern:*

Be it known that I, EDWARD L. GAYLORD, a citizen of the United States, residing at Bridgeport, in the county of Fairfield and State of Connecticut, have invented certain new and useful Improvements in Articles Made from Amber or Ambroid; and I do hereby declare the following to be a full, clear, and exact description of the invention, such as will enable others skilled in the art to which it appertains to make and use the same.

My invention relates to certain improvements in articles made from amber or ambroid, and has for its object to render it possible to make almost any article from amber or ambroid and to strengthen and reinforce the same at the point or points where breakage is most likely to occur and at the same time to greatly enhance the beauty and general appearance of the article.

With these ends in view my invention consists in certain details of construction and combination of parts such as will be hereinafter fully set forth and then specifically designated by the claims.

Figure 1:
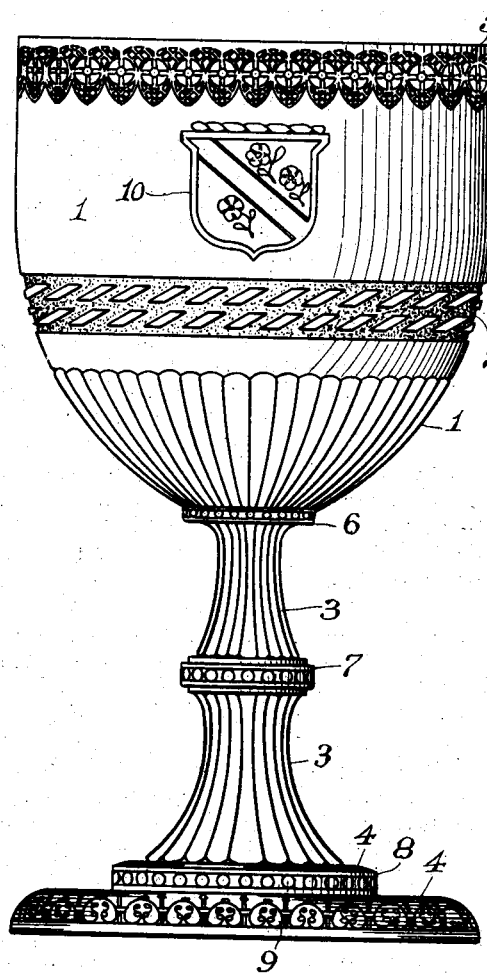
Figure 2:
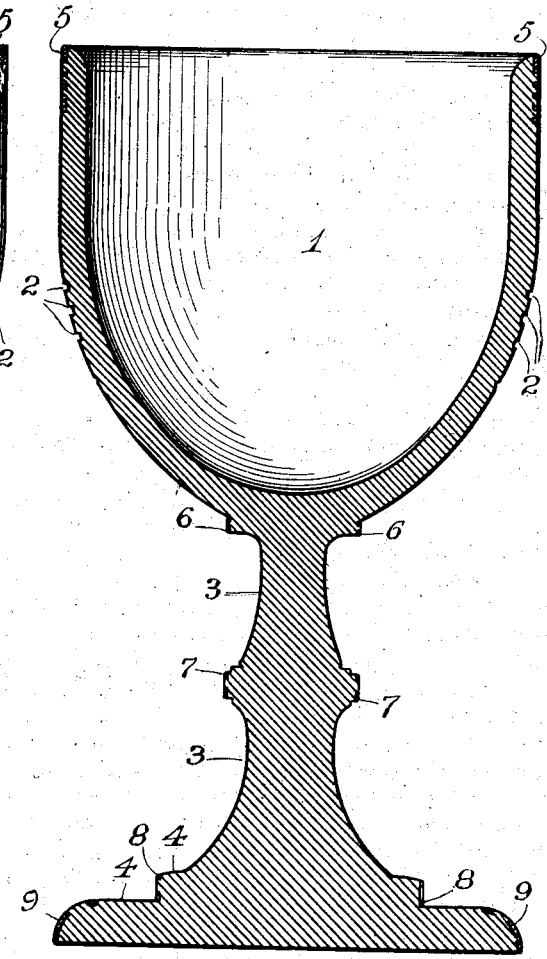

Since my invention is not limited to the production of any particular article, I will not undertake to illustrate or describe any variety of articles made in accordance with my improvement, and therefore in the drawings I have elected as an ordinary type of an article of manufacture constructed in accordance with my improvement a goblet, Figure 1 being an elevation, while Fig. 2 is a central vertical section.

Similar numbers of reference denote like parts in both figures of the drawings.

Heretofore in my applications for Letters Patents of the United States filed December 1, 1903, Serial No. 183,176, and January 27, 1904, Serial No. 190,850, I have illustrated and described in detail the processes which I employ for making the article, which latter forms the subject of the present application, and therefore it is not deemed necessary to describe these processes herein, and I shall accordingly merely refer to them in a general way.

My new article of manufacture is made from amber or ambroid molded into the proper shape and strengthened and ornamented in accordance with the processes set forth in said Letters Patents, the strengthening or ornamenting portions being constructed, preferably, from metal, although in this connection I am enabled to utilize pearl, ivory, precious stones, or lapidary work, or, in fact, any substance or material that will not fuse or disintegrate during the process of molding.

It is very well known that amber is exceedingly brittle, and hitherto this peculiarity has rendered it unsuitable for a great many uses, although its non-solvent and non-absorbent qualities would otherwise render it well adapted for such uses to a marked degree, and, moreover, the nature of amber is such that manual application of strengthening or ornamenting materials is not practicable.

My new article of manufacture is made by packing the amber in powdered or comminuted form within suitable molds, the strengthening and ornamenting portions being of any suitable shape and pattern and fitted snugly within the molds at any desired location therein. These strengthening and ornamenting portions are first placed within the molds so as to fit snugly against the inner surfaces thereof, and the amber is then packed very densely within the molds and against these strengthening and ornamenting portions, so that it will be clear that no particles of amber will get between the outer surfaces of the strengthening and ornamenting portions and the molds themselves. When the proper heat is applied to the molds, the amber will become an integral moldable mass and will be flush with the outer surfaces of the strengthening and ornamenting portions, while the expansion of the amber will cause these portions to be firmly embedded in the completed article. It will thus be readily understood that I am enabled to produce at a reasonable cost a great variety of articles strengthened and ornamented as may be desired, and in this connection I would state that the strengthening and ornamenting portions may have jewels set therein, which latter will be firmly held in place by the setting and will likewise be embedded in the amber during the process of molding. Likewise it will be understood that I can strengthen and ornament articles made of amber by means of gold or silver, or I can utilize cheaper metals, which may thereafter be plated with gold or silver, since amber is non-solvent and electroplating may be accomplished without injury to the article.

Referring to the accompanying drawings, the bowl 1, the ornamental band 2, the stem 3, and the portions of the standard 4 are all made from amber or ambroid molded into the proper shape in accordance with the processes hereinbefore referred to, while the strengthening or ornamenting bands 5, 6, 7, 8, and 9 are constructed of metal of any approved shape and pattern united to the amber during the process of molding and flush with the surface of said amber, as hereinbefore set forth. I have likewise shown a coat of arms 10 embedded in the side of the bowl 1 in accordance with said process.

While I have illustrated an integral goblet, it will of course be understood that in manufacturing any article I can make the same in sections and unite them mechanically, if desired.

By introducing suitable coloring-matter into the amber before the application of heat for the purpose of molding any desired color may thus be given to the article itself, and, as is set forth in the applications hereinbefore referred to, I can make the article clear or cloudy, as may be desired.

Having thus described my invention, what I claim as new, and desire to secure by Letters Patent, is—

1. A new article of manufacture made from amber or ambroid molded into the desired shape with foreign substance embedded in said amber or ambroid during the process of molding.

2. A new article of manufacture comprising a main body portion molded from amber, and strengthening or ornamenting parts embedded in the amber during the process of molding and flush with the surface thereof.

3. A new article of manufacture made from powdered amber and suitable reinforcing material packed within a mold and united by the process of molding.

4. A new article of manufacture made from powdered amber and suitable reinforcing material packed within a mold, the reinforcing material being applied to the external surface of the packed mass of amber, said material and amber being united by the process of molding, whereby in the finished article the reinforcing material will be flush with the surface of the amber.

In testimony whereof I affix my signature in presence of two witnesses.

EDWARD L. GAYLORD.

Witnesses:
F. W. SMITH, Jr.,
M. T. LONGDEN.